US006429157B1

(12) United States Patent
Kishi et al.

(10) Patent No.: US 6,429,157 B1
(45) Date of Patent: Aug. 6, 2002

(54) PREPREG FABRIC AND HONEYCOMB SANDWICH PANEL

(75) Inventors: Hajime Kishi; Masahiko Hayashi; Toshiaki Higashi, all of Ehime (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 09/254,211

(22) PCT Filed: Jul. 10, 1998

(86) PCT No.: PCT/JP98/03095

§ 371 (c)(1),
(2), (4) Date: Mar. 3, 1999

(87) PCT Pub. No.: WO99/02586

PCT Pub. Date: Jan. 21, 1999

(30) Foreign Application Priority Data

Jul. 11, 1997 (JP) .............................................. 9-202563
Jul. 14, 1997 (JP) .............................................. 9-203781

(51) Int. Cl.$^7$ ................................................. B32B 5/16
(52) U.S. Cl. ....................... 442/227; 442/203; 442/286; 428/116
(58) Field of Search ................................. 442/286, 203, 442/227; 428/116

(56) References Cited

U.S. PATENT DOCUMENTS

| 4,323,623 A | * | 4/1982 | Ahrens et al. ............... 428/246 |
| 4,680,216 A | * | 7/1987 | Jacaruso ...................... 428/116 |
| 5,034,256 A | * | 7/1991 | Santiso, III et al. ........... 428/73 |
| 5,397,618 A | * | 3/1995 | Cedarleaf .................... 428/138 |
| 5,455,096 A | * | 10/1995 | Toni et al. ................... 428/116 |
| 5,455,107 A | * | 10/1995 | Homma et al. .............. 428/229 |
| 5,543,212 A | * | 8/1996 | Oosedo et al. ............... 428/229 |
| 5,626,916 A | * | 5/1997 | Kishi et al. .................. 427/386 |
| 5,780,147 A | * | 7/1998 | Sugahara et al. ............ 428/332 |
| 6,027,794 A | * | 2/2000 | Ozaki et al. ............. 428/297.7 |

* cited by examiner

Primary Examiner—Terrel Morris
Assistant Examiner—Norca L. Torres
(74) Attorney, Agent, or Firm—Schnader Harrison Segal & Lewis LLP

(57) ABSTRACT

A woven fabric prepreg comprising at least [A] a woven fabric as reinforcing fibers, [B] a thermosetting resin or thermosetting resin composition and [C] fine particles of a resin and having a cover factor of 95% or more, and a honeycomb sandwich panel, comprising skin panels fabricated by said woven fabric prepreg and [D] a honeycomb core can be obtained. The woven fabric prepreg little changes in tackiness with the lapse of time and has moderate drapability, being excellent in self adhesiveness to the honeycomb core when used as skin panels of a honeycomb sandwich panel. Furthermore, the honeycomb sandwich panel obtained has a small porosity in the skin panels fabricated by the cured prepreg and has excellent surface smoothness with few pits and depressions on the surfaces of the skin panels.

21 Claims, No Drawings

PREPREG FABRIC AND HONEYCOMB SANDWICH PANEL

TECHNICAL FIELD

The present invention relates to a woven fabric prepreg and a honeycomb sandwich panel. In more detail, it relates to a woven fabric prepreg little changing in tackiness with the lapse of time, having moderate drapability, and excellent in the self adhesiveness to a honeycomb core when used as skin panels of a honeycomb sandwich panel, and also relates to a honeycomb sandwich panel small in the internal porosity of the skin panels fabricated by a cured prepreg and excellent in surface smoothness with few holes and depressions on the surfaces of the skin panels.

BACKGROUND ARTS

Fiber reinforced composite materials respectively consisting of reinforcing fibers and a matrix resin have been being widely used for aircraft, automobiles and other industrial applications because of their excellent mechanical properties, etc. In recent years, with accumulated achievements of use, the fiber reinforced composite materials are required to satisfy more and more severe properties. To sufficiently manifest the mechanical properties and durability of fiber reinforced composite materials, it is important to decrease the defects contributing to the decline of strength. Especially for structural materials and interior materials of aircraft, reinforced fiber composite materials are increasingly used as skin panels in honeycomb sandwich panels for reduction of weight. Honeycomb cores used include aramid honeycomb cores and aluminum honeycomb cores. It is generally practiced to produce a honeycomb sandwich panel by laminating a honeycomb core made of aramid paper with prepreg laminates on both sides and curing the prepreg laminates while bonding the prepreg laminates to the honeycomb core as so-called co-curing.

In this case, the adhesive strength between the honeycomb core and the prepreg laminates as skin panels is important, and a method of keeping adhesive films between the honeycomb core and the prepreg laminates and curing the prepreg laminates together with the adhesive films for fabricating a sandwich panel has been popularly used. However, for further weight reduction and fabrication cost reduction of the honeycomb sandwich panel, it is demanded in recent years to directly bond the honeycomb core and the prepreg laminates (hereinafter called self adhesiveness) without using any adhesive film.

However, in the bonding without using any adhesive film, since there is no resin supplied as the resin in the adhesive films, the resin existing in the prepreg laminates must migrate onto the honeycomb core to sufficiently wet the honeycomb core walls instead of the adhesive films during fabrication, and it is a difficult problem to achieve a high adhesive strength. The portions where the resin runs down or rises from the prepreg laminates in the normal direction of the honeycomb core into the honeycomb core wall and is cured are called fillets, and it is difficult to sufficiently form the fillets between the honeycomb core and the top and bottom skin panels. If the viscosity of the resin is too low, the resin from the top skin panel into the honeycomb core wall tends to run down too much, and as a result, the adhesive strength between the top skin panel and the honeycomb core becomes insufficient. On the other hand, if the viscosity of the resin is too high, the resin cannot sufficiently wet the honeycomb core wall, and especially the adhesive strength between the bottom skin panel and the honeycomb core becomes insufficient.

On the other hand, there is also a problem that since the resin in the prepreg laminates must be distributed toward the honeycomb core wall, the absolute amount of the resin in the laminates becomes so insufficient as to make the skin panels likely to be porous. In the case of honeycomb sandwich panel, since no pressure acts on the top or bottom prepreg laminates at the portions corresponding to the hexagonal cavities during fabrication, porosity is likely to take place compared to the fabrication of ordinary prepreg laminates.

Furthermore, to decrease such defects as pits and resin blurs on the surfaces of skin panels, it has been often practiced to stick adhesive films on the surfaces of prepreg laminates, for curing them together with the prepreg laminates. However, for further weight reduction, material cost reduction and fabrication cost reduction of honeycomb sandwich panel, it is desirable to form smooth skin panels free from surface defects without using any adhesive film.

However, since there is no resin supplied as the resin in the adhesive films if no adhesive films are used, the resin remaining on the surfaces of the skin panels become less, and it is a difficult problem to achieve a high grade surface state.

Prior arts concerning the prepregs reinforced by carbon fibers and matrix resins intended for use in honeycomb sandwich panel include the following.

U.S. Pat. No. 4,500,660 discloses an epoxy resin composition obtained by adding dicyanediamide to a specific epoxy resin and the reaction product of butadiene acrylonitrile copolymer having functional groups at both the ends and an epoxy resin. The object is to improve the self adhesiveness of prepreg laminates to a honeycomb core and the interlayer shear strength of skin panels. However, the U.S. patent is not intended for improving the surface smoothness of skin panels, and judging from the curing agent used, the composition is not so sufficient in heat resistance as the composition of the present invention. Furthermore, the resin composition does not contain fine particles of a resin. So, the U.S. patent cannot achieve the object of the present invention.

Japanese Patent Laid-Open (Kokai) No. 58-82755 describes that if a composition obtained by adding dicyanediamide and diaminodiphenylsulfone as curing agents to an epoxy resin and the reaction product of a liquid butadiene acrylonitrile copolymer having carboxyl groups at both the ends and an epoxy resin is used, the self adhesiveness of the prepreg laminates to the honeycomb core, especially the adhesive strength at high temperature becomes high, while the honeycomb sandwich panel does not have defects on the surfaces. However, the patent gazette does not state anything about inhibiting the temporally caused change in the tackiness of the prepreg, and cannot achieve the object of the present invention since the resin composition does not contain fine particles of a resin.

U.S. Pat. No. 5,557,831 describes that if a highly thixotropic resin is used in a woven fabric prepreg to be co-cured for producing a honeycomb sandwich panel, the porosity in the skin panels can be effectively decreased. However, since the resin composition of the US patent does not contain fine particles of a resin, the self adhesiveness of the prepreg laminates to the honeycomb core is poor.

On the other hand, the tackiness and drapability of a prepreg often come into question when a prepreg is used. These properties greatly affect the working convenience when a prepreg is handled.

If the tackiness of a prepreg is too small, the prepreg sheets overlaid and pressed for lamination are soon delaminated. In such a case, the working ambient temperature must be raised until moderate tackiness can be obtained. On the contrary, if the tackiness of a prepreg is too large, any prepreg sheets overlaid by mistake cannot be delaminated for correction since they are strongly bonded by their own weights.

If the drapability of a prepreg is poor, the prepreg is so hard as to remarkably inconvenience lamination work, and the prepreg laminate does not accurately follow the curved surfaces of a mold or the form of a mandrel, being wrinkled or having reinforcing fibers broken, to cause defects in the form obtained. In such a case, the working ambient temperature must be raised, but it is difficult to balance drapability with tackiness. This is a very large problem in the work of fabrication.

The tackiness and drapability of a prepreg are mainly decided by the viscoelasticity of the matrix resin. In general, the viscoelasticity of an epoxy resin greatly depends on temperature, and if the working ambient temperature changes, the adhesiveness and drapability change, not allowing working as the case may be.

Furthermore, even when a prepreg has moderate tackiness immediately after production since the amount of the resin existing on the surface is relatively large, the resin tends to sink inside with the lapse of time, to lose tackiness gradually as temporally caused change. In this case, lamination work under the same conditions cannot be effected to pose a large problem as an industrial material. If the resin has a relatively high viscosity, the temporally caused change of tackiness tends to be small, but on the other hand, drapability is likely to be insufficient.

Epoxy resin compositions with a high molecular epoxy resin added for the purpose of improving fabrication work convenience by optimizing the tackiness and drapability of a prepreg are disclosed in Japanese Patent Laid-Open (Kokai) Nos. 62-127317 and 63-308026. Japanese Patent Laid-Open (Kokai) No. 2-20546 discloses an epoxy resin composition with a nitrile rubber modified epoxy resin added for the purpose of optimizing drapability and resin flow. However, these methods have respective disadvantages such that even if either the tackiness or drapability of a prepreg can be improved, the balance of both is improper, and that the mechanical properties of the obtained form are sacrificed.

As a method for improving the tackiness, etc. of a prepreg, it is known to add a high polymer such as a thermoplastic resin or elastomer to an epoxy resin. For example, it is known to add polyvinyl formal resin as stated in Japanese Patent Laid-Open (Kokai) Nos. 58-8724 and 62-169829, to add polyvinyl acetal resin as stated in Japanese Patent Laid-Open (Kokai) Nos. 55-27342, 55-108443 and 56-2119, to add polyvinyl butyral resin as stated in Japanese Patent Laid-Open (Kokai) No. 52-30187, to add a polyester polyurethane as stated in Japanese Patent Laid-Open (Kokai) No. 5-117423, to add a polyvinyl ether as stated in Japanese Patent Laid-Open (Kokai) No. 4-130156, etc. However, these methods raise the viscosity of the resin to lower drapability disadvantageously, and it has been difficult to find a resin satisfactory in both tackiness and drapability.

That is, with the prior arts, it has been difficult to obtain a prepreg having good physical properties, particularly the self adhesiveness necessary for co-curing of honeycomb sandwich panel, appropriate tackiness free from temporally caused change and sufficient drapability.

The techniques disclosed in the above known arts are insufficient in the self adhesiveness of the skin panels to the honeycomb core or are not intended for decreasing the porosity in the skin panels without describing anything about the effect of porosity decrease. Furthermore, when boards obtained by laminating and curing prepreg sheets are used as skin panels of a honeycomb sandwich panel without using any adhesive films on the skin panels, they are not sufficient in surface smoothness according to the techniques disclosed in the above known arts. Moreover, there has been no technique of providing a woven fabric prepreg improved in tackiness and drapability and decreased in their temporally caused change. That is, it has been a very difficult problem to design a prepreg which satisfies all of higher self adhesiveness of the skin panels to the honeycomb core, decrease of porosity in the skin panels, better surface smoothness on the skin panels of a honeycomb sandwich panel, inhibiting the temporally caused change in the tackiness of a prepreg and good drapability.

DISCLOSURE OF THE INVENTION

The object of the present invention is to provide a woven fabric prepreg having excellent self adhesiveness to the honeycomb core, decrease of porosity of the skin panels, decrease of defects on the surfaces of the skin panels of a honeycomb sandwich panel, appropriate tackiness as a prepreg without any temporally caused change, and drapability.

Since the composites obtained by curing the woven fabric prepreg of the present invention have high heat resistance, toughness and impact resistance, they can be used as excellent structural materials.

The present invention to achieve the above object has the following constitution:

A woven fabric prepreg, comprising at least the following [A], [B] and [C] and having a cover factor of 95% or more:
[A] A woven fabric as reinforcing fibers,
[B] A thermosetting resin or a thermosetting resin composition, and
[C] Fine particles of a resin.

A honeycomb sandwich panel, comprising at least skin-panels comprising at least the following [A], [B] and [C], and the following [D].
[A] A woven fabric as reinforcing fibers,
[B] A thermosetting resin or a thermosetting resin composition,
[C] Fine particles of a resin, and
[D] A honeycomb core.

The expression "cover" factor of the woven fabric prepreg refers to the ratio of the area of the portions occupied by woven yarns to the entire prepreg area. If the woven yarns are spread out more, the cover factor is larger. If a woven fabric prepreg having a cover factor of 95% or more is used as the skin panels, the porosity defect inside the skin panels is decreased, providing skin panels having excellent stiffness and strength, and providing a honeycomb sandwich panel having excellent self adhesiveness of the skin panels to the honeycomb core, when evaluated according to the climbing drum peel method, and having good surface smoothness of the skin panels. Furthermore, the resin is likely to be better retained on the surface of the prepreg, decreasing the temporally caused change of tackiness of the prepreg. If the cover factor is insufficient, it is likely that pits are formed on the surface of the skin panels and that the skin panels become porous, to lower the climbing drum peel strength and to increase the temporally caused change in the tackiness of the prepreg. Furthermore, if the cover factor is large, a formed board having excellent burn-through property and good fire resistance can be obtained. The cover factor range especially suitable for the present invention is 96% or more, and 97.5% or more is more preferable.

THE BEST EMBODIMENTS OF THE INVENTION

In the present invention, [A] is a woven fabric comprising reinforcing fibers. The reinforcing fibers which can be used include glass fibers, carbon fibers, aramid fibers, boron fibers, alumina fibers, silicon carbide fibers, etc. Two or more kinds of these fibers can also be used as a mixture. To obtain composites with lighter weight and higher durability, it is especially preferable to use carbon fibers or graphite fibers. To achieve high tensile strength as fibers and high impact resistance as a honeycomb sandwich panel, high strength carbon fibers with a strand tensile strength of 4.4 GPa or more and a tensile break elongation of 1.7% or more are more preferable.

Furthermore, for higher impact resistance, it is especially preferable to use carbon fibers having a tensile elongation of 1.7% or more, and it is preferable that the carbon fibers have an elastic modulus in tension E of 200 GPa or more and a breaking strain energy of 4.0 mm·kgf/mm$^3$ or more. To use reinforcing fibers with a high elastic modulus in tension E means that a high strength can be obtained in the climbing drum peel test, one of the self adhesiveness evaluation methods. Such high strength high elongation carbon fibers include, for example, those designated T700SC, T800H, T1000G, etc. produced by Toray Industries, Inc., of Japan.

As a woven fabric used as reinforcing fibers, any known two-dimensional woven fabric can be used. Preferable weaves include plain weave, twill weave, leno weave and satin weave. Especially plain weave is suitable since thin composites can be easily produced. The woven yarns of a woven fabric are fiber bundles, and it is preferable that one fiber bundle consists of 2500 to 30000 filaments. If one fiber bundle consists of less than 2500 filaments, the fibers arranged are likely to meander, lowering the strength. If more than 30000 filaments, resin impregnation is unlikely to take place at the time of prepreg production or at the time of fabrication. A more preferable range is 2800 to 25000 filaments. Especially fiber bundles respectively consisting of 5000 to 25000 filaments are preferable since the surface smoothness of the honeycomb skin panel becomes better.

Similarly it is preferable that the fineness of each fiber bundle is 1500 to 20000 deniers. If the fineness is less than 1500 deniers, the arranged fibers are likely to meander, and if more than 20000 deniers, resin impregnation is unlikely to take place at the time of prepreg production or at the time of fabrication.

If a woven fabric is formed by using substantially twistless flat carbon multifilament yarns consisting of many carbon fibers as woven yarns, the fibers of the woven fabric move less and any sinking of the surface resin is unlikely to occur even if the woven fabric prepreg is allowed to stand for a long period of time. So, the temporally caused change in the tackiness of the prepreg can be inhibited preferably. Furthermore, even in the prepreg being formed, the fibers of the woven fabric move less and sinking of the surface resin is unlikely to occur. So, the surface smoothness of the cured honeycomb sandwich panel is improved preferably. The expression "substantially twistless" state refers to a state where a yarn is twisted by less than one turn per 1 m yarn length. It is especially preferable to use a woven fabric formed of substantially twistless multifilament yarns with a bundle integrity of 100 to 1000, preferably 100 to 500 mm as hook drop value, in view of less movement of fibers of the woven fabric, easiness to retain the flat state of woven yarns, inhibiting the temporally caused change in the tackiness of the prepreg and better surface smoothness of the honeycomb sandwich panel. If the yarns are twisted or distorted, the hook drop value becomes smaller.

In the case of a reinforcing woven fabric using carbon fibers, in general, to prevent the problem that carbon filaments broken during production tend to be wound around rollers, the filaments of each precursor fiber bundle are entangled with each other, to be kept integral as a bundle. Furthermore, the amount of the sizing agent deposited and the adhesion between filaments are selected for making the carbon fiber yarns integral. The bundle integrity is controlled by the degree of mutual entanglement of filaments, the amount of the sizing agent deposited and the degree of bonding. If the hook drop value is less than 100 mm, resulting in too intensive bundle integrity, it is difficult to increase the cover factor of the woven fabric or the cover factor of the prepreg described later, and the effect of inhibiting the temporally caused change in the tackiness of the prepreg becomes small. Furthermore, the resin impregnability of the prepreg is likely to be poor. As a result, surface pits and internal voids are likely to be formed in the skin panels. If the hook drop value is more than 1000 mm, the carbon fibers are less integral as bundles, and fuzz is likely to occur, to lower weavability. Furthermore, the strength as a composite material declines.

The use of a woven fabric having an a real unit weight of 100 to 320 g/m$^2$ formed by flat carbon multifilament yarns with a yarn thickness of 0.05 to 0.2 mm and a yarn width/yarn thickness ratio of 30 or more is preferable to keep the crimps small, to keep the fibers of the woven fabric less movable, to keep the resin less movable in the prepreg impregnated with the resin and to inhibit the temporally caused change of tackiness. Furthermore, if such flat weaving yarns are used, a woven fabric with a fiber density higher than that of an ordinary woven fabric can be obtained, and the surface smoothness of the honeycomb sandwich panel can also be improved preferably. Moreover, if flat weaving-yarns are used, the stiffness of the skin panel can be enhanced, and the porosity as an internal defect can be decreased, to enhance the strength measured according to the climbing drum peel method, one of self adhesiveness evaluation methods. It is preferable that the thickness of the woven fabric prepreg is 0.15 to 0.35 mm, since the ruggedness due to bent weaving yarns does not occur so much, improving the surface smoothness of the honeycomb sandwich panel.

A woven fabric using such flat carbon multifilament yarns can be produced, for example, according to the method stated in Japanese Patent Laid-Open (Kokai) No. 7-300739.

In the present invention, it is preferable that the resin content of the prepreg or the skin panels is 33 to 50 wt %. If the resin content is less than 33 wt %, the tackiness of the prepreg is likely to be poor, and the surface pits and resin blurs on the skin panels and the porosity in the skin panels are likely to occur, to lower the self adhesiveness to the honeycomb core. If the resin content is more than 50 wt %, resin run-off is likely to occur at the time of prepreg production and at the time of fabrication, and the weight of the composites is increased to diminish the advantage of light weight. An especially preferable resin content range is 35 to 45 wt %.

In the present invention, the resin designated [B] is a thermosetting resin or a thermosetting resin composition.

The thermosetting resin type is not especially limited as long as it is a resin which can be cured by outside energy such as heat, light or electron beam, to form at least partially a three-dimensional crosslinked molecular structure. Preferable thermosetting resins include epoxy resins, phenol resins, vinyl ester resins, unsaturated polyester resins, cyanate resins, maleimide resins, polyimide resins, etc.

As the thermosetting resin, an epoxy resin can be preferably used. Especially an epoxy resin with an amine, phenol or compound with a carbon-carbon double bond as a precursor is preferable.

Glycidylamine type epoxy resins with an amine as a precursor include tetraglycidyldiaminodiphenylmethane, triglycidyl-p-aminophenol and various isomers of triglycidylaminocresol. Tetraglycidyldiaminodiphenylmethane is preferable as a resin for a composite material destined to be a structural material of aircraft since it is excellent in heat resistance.

Glycidyl ether type epoxy resins with a phenol as a precursor are also preferable. They include bisphenol A type epoxy resins, bisphenol F type epoxy resins, bisphenol S type epoxy resins, phenol novolak type epoxy resins, cresol novolak type epoxy resins and resorcinol type epoxy resins. Among them, a glycidyl ether type epoxy resin of 400 or more in epoxy equivalent can be preferably used, since the self adhesiveness of the skin panels fabricated by curing the prepreg to the honeycomb core can be enhanced.

A liquid bisphenol A type epoxy resin, bisphenol F type epoxy resin or resorcinol type epoxy resin can be preferably added to another epoxy resin and additives since it has a low viscosity.

A solid bisphenol A type epoxy resin gives a structure lower in crosslinking density than a liquid bisphenol A type epoxy resin, and hence lowers heat resistance. However, since it gives a structure with higher toughness, it can be preferably added. It is especially effective for improving the self adhesiveness of the skin panels to the honeycomb core and for inhibiting the temporally caused change in the tackiness of the prepreg. It also preferably enhances the resin viscosity to secure the surface resin in the panels, thereby improving the surface smoothness.

An epoxy resin with a naphthalene skeleton is preferable since it can provide a cured resin with a low water absorption coefficient and high heat resistance. Furthermore, a biphenyl type epoxy resin, dicyclopentadiene type epoxy resin or diphenylfluorene type epoxy resin can also be suitably used to provide a cured resin with a low water absorption coefficient. An urethane modified epoxy resin or isocyanate modified epoxy resin is preferable since it can provide a cured resin with high fracture toughness and high elongation.

These epoxy resins can be used alone or in any proper combination. It is preferable for letting the resin composition have both flowability and heat resistance after curing to use at least a bifunctional epoxy resin and tri- or higher-functional epoxy resin together. Especially a combination of a glycidylamine type epoxy resin and a glycidyl ether type epoxy resin is preferable since all of heat resistance, water resistance and processability can be satisfactory. Furthermore, using at least one epoxy resin liquid at room temperature and one epoxy resin solid at room temperature together is preferable to let the prepreg have proper tackiness and drapability. A phenol novolak type epoxy resin or cresol novolak type epoxy resin is preferable to provide a resin with high heat resistance and water resistance since it has high heat resistance and high water absorption coefficient. It can be added to adjust the tackiness and drapability of the prepreg while enhancing heat resistance and water resistance.

The curing agent used for an epoxy resin can be any compound having an active group capable of reacting with an epoxy group. Compounds which can be preferably suitably used here include those having an amino group, acid anhydride group or azide group. They include, for example, dicyanediamide, diaminodiphenylmethane and various isomers of diaminodiphenylsulfone, aminobenzoates, various acid anhydrides, phenol novolak resin, cresol novolak resin, polyphenol compounds, imidazole derivatives, aliphatic amines, tetramethylguanidine, thiourea added amines, carboxylic anhydrides such as methylhexahydrophthalic anhydride, carboxylic acid hydrazides, carboxylic acid amides, polymercaptan, Lewis acid complexes such as boron trifluoride ethylamine complex, etc. If an aromatic diamine is used as a curing agent, a cured epoxy resin with good heat resistance can be obtained. Especially any of various isomers of diaminodiphenylsulfone is most suitable for obtaining a cured resin with good heat resistance. It is preferable that the amount of it added is an equivalent stoichiometrically. As the case may be, if it is used by about 0.7 to 0.8 in equivalent ratio, a resin with a high elastic modulus can be preferably obtained. Any one or more in combination of these curing agents can be used. A combination of dicyanediamide and a urea compound such as 3,4-dichlorophenyl-1,1-dimethylurea, or an imidazole alone can be preferably used as a curing agent, since high heat resistance and water resistance can be obtained by curing at a relatively low temperature. The use of an acid anhydride for curing is preferable, since the cured resin obtained can be lower in water absorption coefficient than that obtained by using an amine compound as a curing agent. Furthermore, the use of a curing agent concealed for example as microcapsules is preferable since the storage stability of the prepreg is good, particularly since the tackiness and drapability of the prepreg are less likely to change even if the resin is allowed to stand at room temperature.

A preliminary reaction product of some or all of epoxy resins and a curing agent can also be added to the composition. This method is effective for adjusting the viscosity and improving the storage stability.

As the thermosetting resin, a phenol resin can also be preferably used. A phenol resin has high flame retardancy and is preferable for interior materials and building materials. Especially as an interior material of aircraft, a honeycomb sandwich panel is preferable since it has high strength and high stiffness while being light in weight, and if a phenol resin is used as the matrix resin of the skin panels, the obtained honeycomb sandwich panel can be preferably used since it is excellent in flame retardancy and low in the likelihood to smoke in case of a fire.

In general, a thermosetting phenol resin is synthesized by the condensation reaction of a phenol such as phenol, cresol, alkylphenol such as xylenol or halogenated alkylphenol with some in the benzene ring of an alkyphenol substituted by halogen atoms, and an aldehyde such as formaldehyde, acetoaldehyde or furfural. Thermosetting phenol resins can be classified into two major types in reference to the catalyst used for synthesis; novolak type phenol resins synthesized using an acid catalyst and resol type phenol resins synthesized using a basic catalyst. In the present invention, both the types of thermosetting phenol resins can be used. A novolak type phenol resin needs an amine based curing agent such as hexamethylenetetramine as a catalyst when heated to be cured, but a resol type phenol resin can be cured by heating only. If an acid catalyst is added, a resol type phenol resin can be cured at a lower temperature. An ammonia resol type phenol resin and a benzoxazine type phenol resin are also preferable. A benzoxazine type phenol resin is a resin having oxazine rings synthesized from a phenol, aldehyde and amine. Since curing is caused by ring-opening polymerization, condensed water is not produced, and voids are unlikely to be formed in the panel. Therefore, a high strength composites is likely to be obtained preferably. If a bisphenol is selected as the phenol, a bifunctional resin is produced to achieve a higher crosslinking density and higher heat resistance preferably. As the bisphenol used as a raw material, any of various structures such as bisphenol A, bisphenol F, bisphenol S, biphenyl, dihydroxybenzophenone and diphenylfluorene can be used. Furthermore, a polycylic phenol such as naphthol or naphtodiol can also be used as a raw material.

Most phenol resins are dissolved or dispersed in any solvent or water, and a phenol resin with a high solid content is preferable in the present invention since voids are less likely to be formed. Especially a phenol resin with a solid content of 70 wt % or more, especially 80 wt % or more is preferable.

As the thermosetting resin, a cyanate resin can also be preferably used. A cyanate resin is a cyanate of a polyhydric phenol such as bisphenol or phenol novolak. Since a cyanate resin is higher in heat resistance and lower in water absorption coefficient than an epoxy resin, it can be preferably used when the properties in a hygroscopic state at high temperature are important.

As the thermosetting resin, a maleimide resin having two or more maleimide groups on the average in the molecule is also preferable since it has good heat resistance.

Furthermore, a polyimide resin or a resin having vinyl groups or allyl groups such as a vinyl ester resin or an unsaturated polyester resin can also be used as [B].

Using a thermosetting resin composition which can be cured into a resin with a glass transition temperature (Tg) or 160° C. or higher is preferable since the honeycomb sandwich panel can have sufficient heat resistance.

Moreover, the thermosetting resin can contain any of various modifiers to improve the viscoelasticity of the uncured resin and the stiffness and toughness of the cured resin. Specifically one or more additives selected from solid rubbers, liquid rubbers, thermoplastic resin elastomers, thermoplastic resins, inorganic particles, short fibers, etc. can be preferably used.

In general, a solid rubber is preferable since it can raise the viscosity of the epoxy resin containing the rubber in dissolution to a level higher than that achieved by the same amount of a liquid rubber, and since the heat resistance of the composites can be relatively retained while the resin composition being formed is kept at a moderate viscosity. It also decreases the dependence of the viscoelasticity function of the resin composition on temperature, is less likely to worsen the handling convenience even if the working ambient temperature in handling the prepreg changes, diminishes the temporally caused change in the tackiness of the prepreg being allowed to stand, and improves the surface smoothness of the skin panels fabricated by curing the resin. A solid rubber preferable in view of the compatibility with an epoxy resin is an acrylonitrile-butadiene random copolymer. By changing the copolymerization ratio of acrylonitrile, the compatibility with the epoxy resin can be controlled. Furthermore, to improve the adhesiveness to an epoxy resin, a solid rubber with functional groups is more preferable. The functional groups include carboxyl groups, amino groups, etc. Especially a solid acrylonitrile-butadiene rubber containing carboxyl groups is preferable. Hydrogenated nitrile rubber is also preferable since it is excellent in weather resistance. Marketed solid rubbers include NIPOL1072, NIPOL1072J, NIPOL1472, NIPOL1472HV, NIPOL1042, NIPOL1043, NIPOL DN631, NIPOL1001, ZETPOL2020, ZETPOL2220, ZETPOL3110 (respectively produced by Nippon Zeon Co., Ltd.), etc.

It is preferable for inhibiting the temporally caused change in the tackiness of the prepreg being allowed to stand and for improving the surface smoothness of the skin panels fabricated after curing, that the rubber has functional groups and react with epoxy groups while being mixed with an epoxy group, to let the reaction product have a larger molecular weight and to form a branched structure. If such preliminary reaction is positively used, excellent surface smoothness can be obtained, and the amount necessary for effectively inhibiting the temporally caused change in the tackiness of the prepreg can be small compared to the case of without effecting preliminary reaction. For example, the tackiness of the prepreg and the surface smoothness of the fabricated board which can be achieved by adding 7 wt % of a solid rubber without preliminary reaction can be achieved by adding about 3 wt % of a solid rubber if the solid rubber and the epoxy resin are positively caused to preliminarily react with each other with heating. The preliminary reaction is usually effected by mixing with heating. Mixing at 70° C. or higher for 30 minutes or more is preferable since the improvement of surface smoothness and the inhibition of the temporally caused change of tackiness can be effectively achieved. More preferable is mixing at 70° C. or higher for 1 hour or more. However, if the preliminary reaction is effected too much, it can happen that the resin viscosity becomes too high disadvantageously for the process necessary for forming a film and impregnation into fibers. Therefore, more preferable preliminary reaction condition is to mix at 70 to 85° C. for 1 to 3 hours. In the preliminary reaction between a solid rubber and an epoxy resin, it is preferable to mix an epoxy resin with a small number of functional groups for reaction, and then to mix an epoxy resin with a larger number of functional groups, for example, a tetrafunctional epoxy resin, since it is easy to control the viscosity bodying degree. For the same reason, it is preferable that the amount of the tetra- or higher-functional epoxy resin is 60% or less in the epoxy composition.

As the modifier of the thermosetting resin, inorganic particles are also preferable. The compounds which can be used as the inorganic particles include talc, aluminum silicate, silica, calcium carbonate, mica, montmorillonite, smectites, carbon black, silicon carbide, alumina hydrate, etc. These inorganic particles are highly effective for rheology control, i.e., viscosity bodying and thixotropy manifestation. Among them, fine silica particles are known to be highly effective for manifesting thixotropy if they are added to a resin composition. In addition, they can decrease the dependence of the viscoelasticity function of a resin composition on temperature and prevent the worsening in the handling convenience even if the working ambient temperature in handling the prepreg changes. They also decrease the temporally caused change in the tackiness of the prepreg being allowed to stand and improve the surface smoothness of the skin panels obtained by curing, giving an excellent effect to the self adhesiveness to the honeycomb core preferably.

Fine silica particles with silicon dioxide as the basic skeleton with an average primary particle size of 5 to 40 nm, for example, are marketed with a trade name of Aerosil (produced by Japan Aerosil K.K.). A primary particle size of 40 nm or less is preferable since a sufficient viscosity bodying effect can be obtained. The particle size is evaluated using an electron microscope. It is preferable that the specific surface area is 50 to 400 m²/g. Silica particles covered with silanol groups on the surfaces are generally used, but it is preferable to use hydrophobic fine silica particles in which the hydrogen atoms of silanol groups are substituted by methyl groups, octyl groups or dimethylsiloxane groups, etc. because of resin viscosity bodying effect, stabilization of thixotropy, and higher physical properties such as water resistance and compressive strength of the composites.

If a solid rubber is used as the modifier, it is preferable that the amount of it added is 1 to 10 wt % based on the weight of the entire resin composition. If the amount is less than 1 wt %, the tackiness of the prepreg is poor, and pits and resin blurs are likely to be caused on the surfaces of the skin panels of the honeycomb sandwich panel. On the other hand, if more than 10 wt %, the resin viscosity is so high as to make the impregnation into the prepreg difficult. A more preferable range is 2 to 6 wt %, and a further more preferable range is 2 to 4 wt %.

If inorganic particles are added as the modifier, it is preferable that the amount of them added is 0.8 to 8 wt % based on the weight of the entire resin composition. If the amount is less than 0.8 wt %, pits and resin blurs are likely to be caused on the surfaces of the skin panels of the honeycomb sandwich panel, and if more than 8 wt %, the resin viscosity is so high as to make the impregnation into the prepreg difficult. A more preferable range is 0.8 to 5 wt %, and a further more preferable range is 1 to 3 wt %. Either a solid rubber or inorganic particles can be used, but it is preferable to use both, for decreasing the pits on the surfaces of the skin panels, improving the tackiness of the prepreg, inhibiting the temporally caused change of tackiness and retaining the heat resistance of the composites. In this case, the most preferable amounts of them added are 2 to 4 wt % of a solid rubber and 1 to 3 wt % of inorganic particles.

It is also preferable to add a thermoplastic elastomer as the modifier. Especially a polyester based thermoplastic elastomer or polyamide based thermoplastic elastomer can be preferably added. An epoxy resin composition containing a polyester based thermoplastic elastomer or polyamide based thermoplastic elastomer has a low viscosity while showing excellent tackiness, being excellent also in drapability and impregnation into the reinforcing fibers. Compared to the case of without using such a thermoplastic elastomer, the dependence of the viscoelasticity function of the resin on temperature, especially the change at near room temperature is small, and hence the dependence of prepreg handling convenience on temperature is small preferably. Therefore, the prepreg obtained by using such a resin composition can manifest excellent properties such as tackiness, drapability and grade. To achieve the effects, it is preferable to add 1 to 20 parts by weight of a polyester based elastomer or polyamide based elastomer per 100 parts by weight of the thermosetting resin. It is preferable that the melting point of the polyester based thermoplastic elastomer or polyamide based thermoplastic elastomer is 100° C. or higher, since the heat resistance of the thermosetting resin composition after curing is affected. More preferable is 140° C. or higher.

Furthermore, for obtaining a composite material with excellent mechanical properties while the thermosetting resin composition containing a polyester based thermoplastic elastomer or polyamide based thermoplastic elastomer keeps excellent tackiness, it is effective to add a thermoplastic resin thermodynamically dissolvable in the thermosetting resin, particularly a thermoplastic resin having hydrogen bondable functional groups. The reason is estimated to be that the adhesiveness between the matrix resin and the reinforcing fibers is improved.

Adding a thermoplastic resin as the modifier is preferable since the decline of elastic modulus and heat resistance is small compared to the case of adding a rubber or elastomer. Adding a thermoplastic resin soluble in an uncured thermosetting resin is preferable to adding thermoplastic resin particles insoluble at the time of resin preparation or at the time of fabrication, since the effect of improving tackiness is large. Especially in the combination of a thermosetting resin and a thermoplastic resin, it is more preferable to select a thermoplastic resin capable of forming a microphase separated structure in the step of curing after having been dissolved, since the effect of improving toughness is large. The thermoplastic resins which can be added here include polyvinyl formal, polyvinyl butyral, polyvinyl alcohol, polyvinyl pyrrolidone, polyethylene oxide, polymethyl methacrylate, polyacrylamide, nylon copolymers, dimeric acid based polyamides, etc. In view of less decline of heat resistance and elastic modulus and higher toughness improving effect, it is preferable to add a thermoplastic resin belonging to engineering plastics such as a polysulfone, polyether sulfone, polyether imide or polyamide. It is also preferable in view of higher toughness and environment resistance of the cured resin that the thermoplastic resin is reactive with the thermosetting resin. Especially preferable functional groups include carboxyl groups, amino groups, hydroxyl groups, etc.

The thermosetting resin composition of the present invention can contain additives other than the above additives such as a high polymer other than the above, reactive diluent, chain extender and antioxidant.

The high polymer can be any of various high polymers soluble in the epoxy resin for various purposes. Specifically, a reactive silicone as stated in European Patent No. 475611 (corresponding to Japanese Patent Laid-Open (Kokai) No. 6-93103) is preferable since it can improve the toughness and ductility of the cured resin and is effective for adjusting the flowability of the uncured resin.

As the reactive diluent, a monofunctional epoxy compound can be preferably used. The monofunctional epoxy compounds which can be used here include butylglycidyl ether, 2-ethylhexylglycidyl ether, phenylglycidyl ether, cresylglycidyl ether, p-sec-butylglycidyl ether, p-tert-butylglycidyl ether, etc.

As the chain extender, a bisphenol can be preferably used. The bisphenols which can be used here include bisphenol A, bisphenol S, fluorene bisphenol, etc. If a chain extender is used, a prepreg for a honeycomb sandwich panel more excellent in self adhesiveness can be obtained.

The antioxidants which can be preferably used here include phenol based antioxidants such as 2,6-di-tert-butyl-p-cresol (BHT), butylated hydroxyanisole and tocopherol and sulfur based antioxidants such as dilauryl-3,3'-thiodipropionate and distearyl-3,3'-thiodipropionate.

As the thermosetting resin composition of the present invention, a thermosetting resin composition of 1.0 MPa·m$^{1/2}$ or more in the fracture toughness KIC after curing measured based on ASTM D 5045-91 is especially preferable.

If a thermosetting resin composition with a fracture toughness $K_{IC}$ of 1.0 MPa·m$^{1/2}$ or more after curing is used, the propagation of fracture under peeling stress for evaluating the self adhesiveness of the honeycomb sandwich panel as the cured composites is inhibited, a high peeling strength is manifested in the climbing drum peel test (Nomex Honeycomb SAH1/8-8.0 is used, and two sheets of a carbon fiber reinforced prepreg with an a real unit weight of 190 g/m$^2$ and a resin content of 44% are laminated symmetrically on both sides of the honeycomb core (±45°)/(±45°)). A fracture toughness $K_{IC}$ of 1.2 MPa·m$^{1/2}$ or more is preferable for obtaining a high climbing drum peel strength, and more preferable is a fracture toughness $K_{IC}$ of 1.5 MPa·m$^{1/2}$ or more.

A thermosetting resin composition with a fracture toughness $K_{IC}$ of 1.0 MPa·m$^{1/2}$ or more after curing in the present invention can be obtained, for example, as described below.

It is preferable to use a resin large in the molecular weight between functional groups acting as crosslinking points, or to add a molecular chain extender for lowering the crosslinking density, or to add an additive selected from solid rubbers, liquid rubbers, thermoplastic elastomers and thermoplastic resins to the composition. Especially for both heat resistance and toughness improving effect, it is preferable to add a thermoplastic resin. In this case, it is preferable to select a thermoplastic resin which can form a microphase separated structure in the step of curing, since the effect of improving toughness is large. It is preferable that the size of each domain in the phase separated structure (spacing in the phase separated structure in which both phases are continuous) is 10 μm or less, for obtaining a composite material containing reinforcing fibers at a high concentration. For higher toughness improving effect, 1.0 μm or more is preferable.

The thermoplastic resins which can be added here include polyvinyl formal, polyvinyl butyral, polyvinyl alcohol, polyvinyl pyrrolidone, polyethylene oxide, polymethyl methacrylate, polyacrylamide, nylon copolymers, dimeric acid based polyamides, etc. Especially in view of less decline of heat resistance and elastic modulus and higher toughness improving effect, it is preferable to add a thermoplastic resin belonging to engineering plastics such as a polysulfone, polyether sulfone, polyether imide or polyamide. Furthermore, for higher toughness and for retaining the environment resistance of the cured resin, it is preferable that the thermoplastic resin is reactive with the thermosetting resin. Especially preferable functional groups include carboxyl groups, amino groups, hydroxyl groups, etc.

It is preferable that the number average molecular weight of the thermoplastic resin used as the modifier is 10,000 or more, since a high toughness improving effect can be achieved by adding a smaller amount. However, even if the thermoplastic resin is in an oligomer range of 4,000 to 10,000 in number average molecular weight, it can be added by a large amount since the viscosity rise caused by adding the thermoplastic resin oligomer is small compared to that achieved by adding the corresponding polymer, and the toughness improving effect may be higher preferably as the case may be. Especially in the case of an oligomer with an engineering plastic structure with high heat resistance, even if it is added by a large amount, the heat resistance of the entire resin is not impaired. So, the molecular weight can also be in an oligomer range, and especially when the oligomer has reactive ends, an excellent toughness improving effect is likely to be obtained.

[C] is fine particles of a resin. If fine resin particles [C] are mixed and dispersed in the prepreg obtained by combining a matrix resin mainly composed of a thermosetting resin used as [B] and a woven fabric as reinforcing fibers [A], the direct adhesive strength between the skin panels and the honeycomb core achieved by sticking together and co-curing the prepreg and the honeycomb core is greatly improved. Furthermore, the fine resin particles [C] mixed and dispersed have unexpectedly such effects as inhibiting the temporally caused change in the tackiness of the prepreg, improving the surface smoothness of the fabricated skin panels and decreasing the inside porosity.

These effects are especially remarkable when the woven fabric prepreg has a cover factor of 95% or more.

The existence of fine resin particles [C] and a high cover factor inhibit the sinking of the resin inside the fibers and contributes to retaining the tackiness of the prepreg and to improving the surface smoothness of the skin panels.

The resin as the material of the fine resin particles [C] is preferably a thermoplastic resin having bonds selected from carbon-carbon bonds, amide bonds, imide bonds, ester bonds, ether bonds, carbonate bonds, urethane bonds, thioether bonds, sulfone bonds and carbonyl bonds in the main chain, and can also have a crosslinked structure partially. It can be either crystalline or amorphous. Especially polyamides, polycarbonates, polyacetal, polyphenylene oxide, polyphenylene sulfide, polyarylates, polyethers, polyesters, polyimides, polyamidoimides, polyether imides, polysulfones, polyurethanes, polyether sulfones, polyether ketones, etc. are suitable as fine resin particles [C] since they are excellent in both heat resistance and toughness. Among them, polyamides are most preferable since they greatly improve the peel strength between the honeycomb core and the skin panels. Among the polyamides, nylon 12, nylon 11 and nylon 6/12 copolymer are preferable since they give an especially good adhesive strength.

When the material of the fine resin particles [C] is selected, it is preferable that the elastic modulus of the material of the fine resin particles [C] is lower than the elastic modulus of the material obtained by curing the thermosetting resin [B], since a higher adhesive strength can be obtained. It is especially preferable that the bending modulus of elasticity of the material of [C] is ⅔ or less that of the material obtained by curing [B]. More preferable is ½ or less.

Even if the fine resin particles [C] are homogeneously distributed in the resin of the prepreg, they are effective for improving the adhesive strength between the skin panels and the honeycomb core, inhibiting the temporally caused change in the tackiness of the prepreg and improving the surface smoothness of the skin panels. However, it is also preferable that they are distributed at a high concentration near the surfaces of the prepreg laminates, i.e., near the surfaces adhesive to the honeycomb core after fabrication, since the adhesive strength can be improved without lowering the stiffness and heat resistance of the skin panels. Furthermore, it is also preferable to distribute them at a high concentration near the surfaces of the skin panels, since the surface smoothness can be improved effectively without lowering the stiffness and heat resistance of the skin panels. As for the form of the particles, the fine resin particles [C] can be any of spherical particles, amorphous particles, porous particles, fibrous particles large in aspect ratio, etc. However, almost spherical particles are especially preferable, since the effect of inhibiting the temporally caused change in the tackiness of the prepreg, self adhesiveness and the surface smoothness of the composites are excellent.

When the fine resin particles [C] are of a thermoplastic resin, it is preferable that the particle size is 1 to 50 μm. If the average primary particle size is less than 1 μm, the effect of improving the adhesive strength between the skin panels and the honeycomb core is small, and if more than 50 μm, the arrangement of reinforcing fibers may be disordered to lower the strength or to make the impregnation insufficient. A more preferable particle size range is 1 to 30 μm.

Fine rubber particles can also be used as the fine resin particles [C]. For example, core/shell type rubber particles can be used. They can be produced according to the methods disclosed in U.S. Pat. No. 4,419,496, European Patent No. 45,357 and Japanese Patent Laid-Open (Kokai) No. 55-94917. Marketed core/shell type rubber particles include, for example, Paraloid EXL2655 (produced by Kureha Chemical Industry Co., Ltd.), TR2122 (produced by Takeda Chemical Industries, Ltd.), EXL-2611, EXL-3387 (produced by Rohm & Haas), etc. Crosslinked rubber particles are also preferable as the fine resin particles [C]. Marketed crosslinked rubber particles include XER71P, XER-91P (produced by Nippon Gosei Gomu K.K.), etc. It is preferable that the rubber particle size is 5 μm or less. More preferable is 1 μm or less. If the particle size is larger than 10 μm, the fine particles cannot be homogeneously dispersed when the reinforcing fibers are impregnated with the matrix resin, and it becomes difficult to obtain the toughness improving effect. If the particle size is 1 μm or less, the fiber orientation is not disturbed even when the composite has a high reinforcing fiber content of 50 vol % or more, and the effect of improving the peel strength is remarkable preferably.

It is preferable that the content of the fine resin particles [C] is 2 to 15% based on the cured resin consisting of [B] and [C] If the content is less than 2%, the effect of improving the adhesive strength between the skin panels and the honeycomb core is poor, and if more than 15%, the strength of the honeycomb sandwich panel may decline or the resin impregnation may become insufficient.

It is preferable for improving the self adhesiveness that the fine resin particles [C] have functional groups capable of reacting with the thermosetting resin [B]. Preferable functional groups include epoxy groups, carboxyl groups, hydroxyl groups, etc.

The form, size and distribution of the fine resin particles [C] are evaluated by observation with a microscope. An optical microscope can also be used, but a scanning electron microscope is preferable since observation at a high magnification can be effected. A preferable method for observing the form and size of particles is to dissolve the matrix resin in the prepreg into a proper solvent without solving the particles only, to secure them by filtration, and then to observe them by a microscope. Therefore, the solvent used depends on the fine resin particles and the matrix resin used. It can be considered to use a chlorine based solvent such as methylene chloride or a solvent such as acetone or methyl ethyl ketone. The content of fine particles can be calculated from the weight of the fine particles secured by filtration, the weight of the original prepreg and the weight of the reinforcing fibers remaining undissolved. For evaluating the distribution of fine particles existing in the prepreg, it is preferable to cure the prepreg gradually from a low temperature taking about 3 weeks to 1 month while keeping the resin in the prepreg immobilized, and then to observe a ground surface. For clarifying the distribution of the material, it is preferable to dye with osmium tetroxide or phosphorus wolframate, etc. before observation, for establishing a contrast.

The prepreg can be produced by the wet method of dissolving a matrix resin into a solvent for lowering the viscosity for impregnation or the hot melt method (dry method) of heating the resin for lowering the viscosity for impregnation, etc. In the hot melt method, a film obtained by coating releasing paper, etc. with an epoxy resin composition is overlaid on one or both sides of reinforcing fibers, and heating and pressing them for resin impregnation, to produce a prepreg. This method is easy to control the resin content and the prepreg thickness, allows a prepreg with a high cover factor to be easily obtained by selecting the pressure and temperature at the time of resin impregnation, and can provide a prepreg little changing in tackiness with the lapse of time, being able to improve the surface smoothness of the fabricated board.

[D] is a honeycomb core. As the honeycomb core, a Nomex honeycomb core made of aramid paper impregnated with a phenol resin is especially preferable since a light weight high strength structure can be fabricated. The cell size generally used is 3 to 19 mm. Furthermore, an aluminum honeycomb core, glass fiber reinforced plastic (GFRP) honeycomb core, graphite honeycomb core, paper honeycomb core, etc. can also be used.

A honeycomb sandwich panel is produced by laminating several sheets of a prepreg consisting of reinforcing fibers and a matrix resin on both sides of a honeycomb, and curing the resin in the prepreg, for bonding to the honeycomb core.

The honeycomb sandwich panel can be fabricated by vacuum bag forming, autoclave forming using a vacuum bag, press forming, etc. To obtain a high performance honeycomb sandwich panel, autoclave forming is especially preferable. On the other hand, to obtain high grade surface smoothness at shorter fabrication cycles, press forming is more preferable. Especially when a phenol resin is used as the matrix resin, press forming is mostly used.

The self adhesiveness of the skin panels to the honeycomb core of a honeycomb sandwich panel was evaluated using the climbing drum peel strength (CDP). The lamination composition of a woven fabric prepreg was a two-ply symmetrical laminate of (±45°)/(±45°) on both sides of the honeycomb core. When an epoxy resin was used as the matrix resin, the prepreg was cured by heating to 180° C. at 1.5° C./min and keeping at the same temperature for 2 hours in an autoclave. In this case, at first, the laminate on an aluminum tool board was covered with a nylon bag, and they were supplied into an autoclave with the inside of the bag kept in vacuum. Then, a pressure of up to 1.5 kg/cm$^2$ was applied, when the vacuum in the bag was returned to atmospheric pressure, and the pressure was raised to 3 kg/cm$^2$, for subsequent heating. When a phenol resin was used as the matrix resin, press forming was effected at 140° C. for 10 minutes at a pressure of 17 kg/cm$^2$.

Methods for measuring physical properties and methods for evaluating effects in the present invention were as described below.

[Cover Factor]

At first, a stereoscopic microscope, for example, stereoscopic microscope SMZ-10-1 produced by Nikon Corp. is used to photograph the surface of a woven fabric prepreg while light is applied from the back side of the prepreg. As a result, a transmitted light pattern of the woven fabric black in weaving yarn portions and white in mesh portions is photographed. The quantity of light is set within a range not causing any halation. The photo obtained is photographed by a CCD (charge coupled device) camera, and the image is converted into digital data expressing black and white. The digital data are stored in a memory and analyzed by an image processor, to calculate the cover factor (Cf) from the following formula in reference to the entire area A1 and the area S2 of white portions (mesh portions)

$$Cf=[(S1-S2)/S1] \times 100$$

In the present invention, as the CCD camera and the image processor, Personal Image Analysis System LA-525 produced by K.K. Pias was used. The digital data include intermediate portions of black and white at the borders between weaving yarn portions (black portions) and mesh portions (white portions). The threshold value for identifying the intermediate portions as weaving yarn portions and mesh portions must be set. As a model for it, a lattice with a real cover factor of 75% (6 mm wide black tapes were stuck lengthwise and crosswise onto transparent paper, to achieve a cover factor of 75%), and standardization was effected to recognize the model accurately as a cover factor of 75%.

[Strand Tensile Strength]

Measured based on JIS R 7601.

[Elastic Modulus in Tension E]

Measured based on JIS R 7601.

[Breaking Strain Energy]

The tensile strength ($\sigma$: kgf/mm$^2$) and elastic modulus E measured according to JIS R 7601 are used to calculate from the following formula: $W=\sigma^2/2E$.

[Hook Drop Value]

A carbon fiber bundle is suspended vertically at 23° C. and 60% humidity, and an about 100 mm long stainless steel wire having a diameter of 1 mm bent at top and bottom by 20 to 30 mm and having a weight of 12 g at the bottom is hooked at the top into the fiber bundle. Thirty minutes later, the weight drop distance is measured. [Fracture toughness $K_{IC}$ of thermosetting resin composition after curing].

Measured based on ASTM D 5045-91. A 6 mm thick cured resin is prepared as a specimen, and the value is obtained by measuring according to the notched three-point bending method.

[Tackiness of Prepreg]

For evaluating the tackiness of a prepreg, sheets of the prepreg are bonded to each other by pressure, and the peeling force is measured. This measuring method depends on such parameters as load stress, speed, time, temperature and humidity. For evaluating the tackiness in the examples of the present invention, "Instron" 4201 Universal Testing Machine (produced by Instron Japan K.K.) was used as the measuring instrument, and measurement was effected under the following conditions:

Sample: 50×50 mm
Load speed: 1 mm/min.
Bonding load: 0.12 MPa
Loading time: 5±2 sec.
Peeling speed: 10 mm/min.
Environment: 25° C. and 50% relative humidity

[Porosity in Skin Panel]

The porosity in the skin panels of a honeycomb sandwich panel is determined according to the area method. On the upper surface of a honeycomb core, a woven fabric prepreg is laminated in (±45°)/(0°/90°)/(0°/90°)/(0°/90°) to call from top, and on the under surface of the honeycomb core, the woven fabric prepreg is laminated in (0°/90°)/(0°/90°)/(±45°). A section of the sandwich panel in which the prepreg is directly bonded on the honeycomb core and cured is photographed at a magnification of 25 times using a microscope, and an about 26 cm long and about 19 cm wide piece of the honeycomb sandwich panel is obtained by cutting in the transverse direction. The value obtained by dividing the porosity area in the bottom skin panel section by the sectional area of a skin panel is obtained as an indicator. In this case, a 25.4 mm length range with the largest porosity in all the field observed in the section is selected to calculate the porosity area.

[Surface Smoothness of Skin Panel]

The surface smoothness of the skin panels of a honeycomb sandwich panel produced according to the following method is evaluated using a surface roughness tester.

At first a prepreg is laminated on both sides of a honeycomb core to have two plies of (±45°)/(±45°) on each side symmetrically. The laminate consisting of the honeycomb core and the prepreg is placed on an aluminum board with a fluorine resin film laid on it, and fabricated. The surface roughness of the tool board side of the honeycomb sandwich panel is determined by surface roughness tester Surftest 301 produced by Mitsutoyo K.K. With a length of 8 mm identified by a probe, the difference between the average height of the five highest points selected and the average height of the five lowest points selected is obtained. This is effected five times, and the average value is obtained.

[Climbing Drum Peel Test]

According to ASTM D 1781.

As the honeycomb core used for these tests, Nomex Honeycomb SAH1/8-8.0 (SAH1/8-8.0, 12.7 mm thick, produced by Showa Aircraft Industry Co., Ltd.) was used in the case of epoxy resin matrix, and Nomex Honeycomb SAH/8-3.0 (SAH1/8-3.0, 12.7 mm thick, produced by Showa Aircraft Industry Co., Ltd.) was used in the case of phenol resin matrix.

The present invention is described below in detail in reference to examples.

EXAMPLE 1

Forty five parts by weight of bisphenol A type liquid epoxy (Ep828 produced by Yuka Shell Epoxy K.K.), 25 parts by weight of cresol novolak type solid epoxy (ESCN220 produced by Sumitomo Chemical Co., Ltd.), 4 parts by weight of carboxyl group-containing solid acrylonitrile butadiene rubber (NIPOL1072 produced by Nippon Zeon Co., Ltd.) and 16 parts by weight of fine nylon 12 particles (SP-500, average particle size 5 $\mu$m, produced by Toray Industries, Inc.) were kneaded by a kneader. Furthermore, 30 parts by weight of tetraglycidyldiaminodiphenylmethane (ELM434 produced by Sumitomo Chemical Co., Ltd.) and 3 parts by weight of fine silica particles treated on the surfaces by trimethylsilyl groups (Aerosil R812 produced by Degusa) were added, and the mixture was kneaded. To the mixture, 38 parts by weight of 4,4'-diaminodiphenylsulfone were added as a curing agent, and the mixture was stirred at 60° C. for 30 minutes, to prepare an epoxy resin composition. It was cured, and the fracture toughness was measured and found to be 1.5 MPa·m$^{1/2}$. The Tg of the cured resin was 214° C. For reference, the same resin except that no fine nylon 12 particles were contained was prepared and cured, and the elastic modulus was measured and found to be 3450 MPa. The elastic modulus of nylon 12 was 1080 MPa.

Releasing paper was coated with the resin composition, to prepare a resin film with an areal unit resin weight of 66 g/m$^2$. The resin film was set in a prepreg machine, and a carbon fiber plain weave (areal unit weight 190 g/m$^2$, yarn thickness 0.11, yarn width/yarn thickness ratio 70.2) formed by carbon fibers T700SC-12K (12000 filaments, 7200 deniers) produced by Toray Industries, Inc. with a strand tensile strength of 4.9 GPa, an elastic modulus in tension of 230 GPa, tensile elongation at break of 2.1% and a hook drop value of 170 mm was impregnated with the resin from both sides, to obtain a prepreg. In this case, the impregnation temperature was 100° C. The cover factor of the prepared prepreg was 99.2%. Before lamination and fabrication, the tackiness of the prepreg was measured and found to be 0.15 MPa. The same prepreg was allowed to stand at 25° C. and 50% relative humidity for 10 days, and the tackiness was 0.12 MPa, showing little temporally caused change. The drapability of the prepreg was also good.

A laminate consisting of a honeycomb core and the prepreg was placed on an aluminum board with a fluorine resin film laid on it, and packed in vacuum by a nylon film, being fabricated in an autoclave. Between the prepreg and the honeycomb core, no adhesive film was placed, and the prepreg was cured to be directly bonded to the honeycomb core. The climbing drum peel test of the obtained honeycomb sandwich panel was performed according to ASTM D 1781, and the peel strength was 15.4 lbs·inches/3-inch width.

To obtain the porosity in the bottom skin panel, a cross section of the sandwich panel was polished by sand paper and alumina powder, and photographed using an optical microscope. From the photo, the porosity was found to be as small as 0.04%. Furthermore, the surface roughness on the tool side of the honeycomb sandwich panel was measured and found to be as excellent as 3.8 µm. The panel was dyed with osmium tetroxide, and a reflected electron image by a scanning electron microscope was observed. It could be confirmed that many spherical fine nylon particles were uniformly distributed in the resin rich portion of the skin panel.

Comparative Example 1

A resin composition was prepared as described for Example 1, except that fine nylon 12 particles were not added. The resin was cured and the fracture toughness was measured and found to be 0.7 MPa·m$^{1/2}$. Then, as described for Example 1, a prepreg was obtained. The cover factor of the prepreg was 99.4%. The tackiness of the prepreg was measured and found to be 0.14 MPa. The tackiness of the same prepreg which was allowed to stand at 25° C. and 50% relative humidity for 10 days was 0.07 MPa, showing a large temporally caused change. A honeycomb sandwich panel was obtained as described for Example 1 and subjected to the climbing drum peel test, and the peel strength was 9.8 lbs inches/3-inch width. The porosity in the bottom skin panel was 0.21%, and the surface roughness was 15.4 µm.

Comparative Example 2

A prepreg was obtained using the same resin composition as used in Example 1 as described for Example 1, except that the impregnation time at the time of prepreg preparation was 60° C. The cover factor of the prepreg was 94.4%. The tackiness of the prepreg was measured and found to be 0.15 MPa. The tackiness of the same prepreg which was allowed to stand at 25° C. and 50% relative humidity for 10 hours was 0.08 MPa, showing a large temporally caused change. A honeycomb sandwich panel was obtained as described for Example 1 and subjected to a climbing drum peel test, and the peel strength was 12.4 lbs·inches/3-inch width. The porosity in the bottom skin panel was 0.18%, and the surface roughness was 14.9 µm.

EXAMPLE 2

Thirty five parts by weight of bisphenol F type liquid epoxy (Epc830 produced by Dainippon Ink & Chemicals, Inc.), 35 parts by weight of brominated bisphenol A type solid epoxy (Epc152 produced by Dainippon Ink & Chemicals, Inc.), 5 parts by weight of carboxyl group-containing solid acrylonitrile butadiene rubber (NIPOL1472HV produced by Zeon Chemical) and 16 parts by weight of fine nylon 11 particles D-30 (average particle size 30 µm, produced by Nippon Rilsan K.K.) were kneaded by a kneader. Furthermore, 30 parts by weight of tetraglycidyldiaminodiphenylmethane (ELM434 produced by Sumitomo Chemical Co., Ltd.) and 4 parts by weight of fine silica particles treated on the surfaces with dimethylsilicone groups (Aerosil RY200 produced by Nippon Aerosil) were added to the mixture, and the mixture was kneaded. To the mixture, 40 parts by weight of 4,4'-diaminodiphenylsulfone were added as a curing agent, and the mixture was stirred at 60° C. for 30 minutes to prepare an epoxy resin composition. The resin was cured, and the fracture toughness was measured and found to be 1.3 MPa·m$^{1/2}$. The Tg of the cured resin was 203° C. For reference, the resin excluding the fine nylon 11 particles was cured, and the elastic modulus was measured and found to be 3470 MPa. The elastic modulus of nylon 11 was 990 MPa.

Releasing paper was coated with the resin composition at 70° C., to prepare a resin film with an areal resin unit weight of 66 g/m$^2$. The resin film was set in a prepreg machine, and the same carbon fiber plain weave (areal unit weight 190 g/m$^2$) of carbon fibers T700S-12K produced by Toray Industries, Inc. as used in Example 1 was impregnated on both sides with the resin, to obtain a prepreg. The impregnation temperature in this case was 100° C. The cover factor of the prepreg was 97.9%. The tackiness of the prepreg was measured and found to be 0.16 MPa. The tackiness of the same prepreg which was allowed to stand at 25° C. and 50% relative humidity for 10 days was 0.13 MPa, showing a little temporally caused change. The drapability of the prepreg was good.

A honeycomb sandwich panel was obtained as described for Example 1 and subjected to a climbing drum peel test according to ASTM D 1781, and the peel strength was 13.4 lbs·inches/3-inch width.

The porosity in the bottom skin panel was as small as 0.08%. The surface roughness on the tool side of the honeycomb sandwich panel was measured and found to be 7.9 µm. The same panel was dyed with osmium tetroxide, and a reflected electron image by a scanning electron microscope was observed, and it could be confirmed that fine amorphous nylon particles were uniformly distributed in the resin rich portion of the skin panel.

EXAMPLE 3

Forty parts by weight of bisphenol A type liquid epoxy (Ep828, epoxy equivalent 189, produced by Yuka Shell Epoxy K.K.), 30 parts by weight of bisphenol A type solid epoxy (Ep1001, epoxy equivalent 467, produced by Yuka Shell Epoxy K.K.), 5 parts by weight of carboxyl group-containing solid acrylonitrile butadiene rubber (NIPOL1072 produced by Nippon Zeon Co., Ltd.) and 16 parts by weight of fine nylon 12 particles (SP-500, average particle size 5 µm, produced by Toray Industries, Inc.) were kneaded by a kneader. To the mixture, 30 parts by weight of tetraglycidyl-diaminodiphenylmethane (ELM434 produced by Sumitomo Chemical Co., Ltd.) and 6 parts by weight of fine silica particles treated on the surfaces with trimethylsilyl groups (Aerosil R812 produced by Degusa) were added and the mixture was kneaded. Furthermore, 40 parts by weight of 4,4'-diaminodiphenylsulfone were added as a curing agent, and the mixture was stirred at 60° C. for 30 minutes, to prepare an epoxy resin composition. The resin was cured and the fracture toughness was measured and found to be 1.7 MPa·m$^{1/2}$. The Tg of the cured resin was 191° C. For reference, the same resin without containing the fine nylon 12 particles was cured, and the elastic modulus was measured and found to be 3320 MPa. The elastic modulus of nylon 12 was 1080 MPa.

Releasing paper was coated with the resin composition at 65° C., to prepare a resin film with an areal resin unit weight of 66 g/m². The resin film was set in a prepreg machine, and a carbon fiber plain weave (areal unit weight 190 g/m²) of carbon fibers T700SC-12K produced by Toray Industries, Inc. was impregnated on both sides with the resin, to obtain a prepreg. In this case, the impregnation temperature was 100° C. The cover factor of the prepared prepreg was 99.6%. The tackiness of the prepreg was measured and found to be 0.14 MPa. The tackiness of the same prepreg which was allowed to stand at 25° C. and 50% relative humidity for 10 days was 0.12 MPa, showing a little temporally caused change. The drapability of the prepreg was good.

A honeycomb sandwich panel was obtained as described for Example 1 and subjected to a climbing drum peel test according to ASTM D 1781, and the peel strength was 19.1 lbs·inches/3-inch width.

The porosity in the bottom skin panel was as small as 0.02%. The surface roughness on the tool side of the honeycomb sandwich panel was measured and found to be as excellent as 3.8 μm. The panel was dyed with osmium tetroxide, and a reflected electron image by a scanning electron microscope was observed. It could be confirmed that many fine spherical nylon particles were uniformly distributed in the resin rich portion of the skin panel.

EXAMPLE 4

A resin composition was prepared as described for Example 3, except that fine nylon 6/12 copolymer particles Orgasole 3202D (produced by Atokem K.K.) was used instead of fine nylon 12 particles SP-500. Orgasole was porous particles with an average particle size of 20 μm. Then, as described for Example 3, a prepreg and a honeycomb sandwich panel were obtained. The cover factor of the prepreg was 99.1%. The tackiness of the prepreg was measured and found to be 0.13 MPa. The tackiness of the same prepreg which was allowed to stand at 25° C. and 50% relative humidity for 10 days was 0.11 MPa, showing a little temporally caused change. The drapability of the prepreg was good. The resin was cured, and the fracture toughness was measured and found to be 1.5 MPa·m$^{1/2}$. The Tg of the cured resin was 190° C. For reference, the resin without containing the fine nylon 6/12 particles was cured, and the elastic modulus was measured and found to be 3320 MPa. The elastic modulus of nylon 6/12 was 1610 MPa. The honeycomb sandwich panel was subjected to a climbing drum peel test, and the peel strength was 18.2 lbs·inches/3-inch width. The porosity of the bottom skin panel was 0.07%. The surface smoothness was measured and found to be 6.1 μm. The panel was dyed with osmium tetroxide, and a reflected electron image by a scanning electron microscope was observed, and it could be confirmed that many very rugged fine nylon particles existed in the resin rich portion of the skin panel.

EXAMPLE 5

A resin composition was prepared as described for Example 3, except that fine nylon 6 particles Orgasole 1002D (produced by Atokem K.K.) was used instead of fine nylon 12 particles SP-500. Orgasole was porous particles with an average particle size of 20 μm. Then, a prepreg and a honeycomb sandwich were obtained as described for Example 3. The cover factor of the prepreg was 99.3%. The tackiness of the prepreg was measured and found to be 0.16 MPa. The tackiness of the prepreg which was allowed to stand at 25° C. and 50% relative humidity for 10 days was 0.12 MPa, showing a little temporally caused change. The drapability of the prepreg was good. The resin was cured, and the fracture toughness was measured and found to be 1.3 MPa·m$^{1/2}$. The Tg of the cured resin was 192° C. For reference, the elastic modulus of the cured resin without containing any fine nylon 6 particles was measured and found to be 3320 MPa. The elastic modulus of nylon 6 was 2800 MPa. The honeycomb sandwich panel was subjected to a climbing drum peel test, and the peel strength was 14.2 lbs·inches/3-inch width. The porosity in the bottom skin panel was 0.11%. The surface smoothness was measured and found to be 8.7 μm. The panel was dyed with osmium tetroxide, and a reflected electron image by a scanning electron microscope was observed. It could be confirmed that many very rugged fine nylon particles existed in the resin rich portion of the skin panel.

EXAMPLE 6

A prepreg was obtained as described for Example 1, except that a carbon fiber plain weave (areal unit weight 193 g/m², yarn thickness 0.13 mm, yarn width/yarn thickness ratio 12.1) of carbon fibers T300-3K (3000 filaments, 1800 deniers) produced by Toray Industries, Inc. with a strand tensile strength of 3.53 GPa, elastic modulus in tension of 230 GPa, tensile elongation at break of 1.5% and hook drop value of 160 mm was used as the carbon fiber woven fabric. The cover factor of the prepreg was 96.4%. The tackiness of the prepreg was measured and found to be 0.15 MPa. The tackiness of the same prepreg which was allowed to stand at 25° C. and 50% relative humidity for 10 days was 0.10 MPa. The drapability of the prepreg was good.

A honeycomb sandwich panel was obtained as described for Example 1 and subjected to a climbing drum peel test according to ASTM D 1781, and the peel strength was 14.1 lbs·inches/3-inch width.

The porosity in the bottom skin panel was 0.11%. The surface roughness on the tool side of the honeycomb sandwich panel was measured and found to be 8.6 μm. The panel was dyed with osmium tetroxide, and a reflected electron image by a scanning electron microscope was observed. It could be confirmed that many fine spherical nylon particles were uniformly distributed in the resin rich portion of the skin panel.

EXAMPLE 7

Forty five parts by weight of bisphenol A type solid epoxy (Ep1001, epoxy equivalent 467, produced by Yuka Shell Epoxy K.K.), 30 parts by weight of bisphenol A type liquid epoxy (Ep828, epoxy equivalent 189, produced by Yuka Shell Epoxy K.K.), 25 parts by weight of tetraglycidyldiaminodiphenylmethane (ELM434 produced by Sumitomo Chemical Co., Ltd.) and 30 parts of hydroxyl group-ended polyether sulfone (5003P produced by Mitsui Toatsu Chemicals, Inc.) were kneaded in a kneader at 130° C. for 2 hours. To the mixture, 12 parts by weight of fine nylon 12 particles (SP-500, average particle size 5 μm, produced by Toray Industries, Inc.) and 25 parts by weight of 4,4'-diaminodiphenylsulfone as a curing agent were added, and the mixture was stirred at 60° C. for 30 minutes, to prepare an epoxy resin composition. The resin was cured, and the fracture toughness was measured and found to be 1.8 MPa·m$^{1/2}$. The Tg of the cured resin was 178° C. The fracture face of the cured resin was observed by a scanning electron microscope, and a microphase separated structure with domains of about 3 μm in average particle size could be confirmed.

Releasing paper was coated with the resin composition, to prepare a resin film with an areal resin unit weight of 66 g/m². The resin film was set in a prepreg machine, and a carbon fiber plain weave (areal unit weight 190 g/m², yarn thickness 0.11 mm, yarn width/yarn thickness ratio 70.2) of carbon fibers T700SC-12K (12000 filaments, 7200 deniers) produced by Toray Industries, Inc. with a strand tensile strength of 4.9 GPa, elastic modulus in tension of 230 GPa, tensile elongation at break of 2.1% and hook drop value of 170 mm was impregnated on both sides with the resin, to obtain a prepreg. In this case, the impregnation temperature was 100° C. The cover factor of the prepared prepreg was 98.3%, and the tackiness and drapability of the prepreg were good.

A laminate consisting of a honeycomb core and the prepreg was placed on an aluminum board with a fluorine resin film laid on it, and the laminate was packed in vacuum by a nylon film, being fabricated in an autoclave. No adhesive film was placed between the prepreg and the honeycomb core, and the prepreg was cured to be directly bonded to the honeycomb core. The honeycomb sandwich panel obtained like this was subjected to a climbing drum peel test according to ASTM D 1781. The peel strength was 19.3 lbs·inches/3-inch width.

Comparative Example 3

A resin composition was prepared as described for Example 7, except that the fine nylon 12 particles were not added. The fracture toughness was measured and found to be 0.9 MPa·m$^{1/2}$. A prepreg was obtained as described for Example 1. The cover factor of the prepreg was 98.4%. A honeycomb sandwich panel was obtained as described for Example 1, and subjected to a climbing drum peel test. The peel strength was 8.8 lbs·inches/3-inch width.

Industrial Applicability

According to the present invention, a woven fabric prepreg small in the surface porosity of the skin panels, less in the number of pits, excellent in smoothness, small in internal porosity, excellent in self adhesiveness and little changing in tackiness with the lapse of time when fabricated as a honeycomb sandwich panel can be obtained.

What is claimed is:

1. A woven fabric prepreg comprising:
   (A) a woven fabric comprising a plurality of reinforcing fibers;
   (B) a matrix resin surrounding said fibers and comprising a thermosetting resin or a thermosetting resin composition; and
   (C) 2–15% by weight based upon the weight of resin (B)+(C) of fine particles of at least one resin selected from the group consisting of polyamides, polyethers, polyesters, polyimides, polysulfones and polyurethanes, said particles having a particle size of 1–50 μm;
   wherein said woven fabric prepreg has a cover factor of 95% or more.

2. A woven fabric prepreg, according to claim 1, wherein said woven fabric (A) comprises at least one of carbon fibers and graphite fibers.

3. A woven fabric prepreg, according to claim 1, wherein said woven fabric (A) is formed by reinforcing multifilament yarns with a yarn thickness of 0.05 to 0.2 mm and with a yarn width/yarn thickness ratio of 30 or more.

4. A woven fabric prepreg, according to claim 1, wherein said woven fabric (A) is formed by carbon fiber yarns with an elastic modulus in tension of 200 GPa or more.

5. A woven fabric prepreg, according to claim 1, wherein said woven fabric (A) is formed by reinforcing multifilament yarns respectively consisting of 5,000 to 30,000 filaments.

6. A woven fabric prepreg, according to claim 1, wherein said woven fabric (A) has carbon multifilament yarns as weaving yarns, with an areal unit weight of 100 to 320 g/m².

7. A woven fabric prepreg, according to claim 1, wherein a structure of said woven fabric (A) is selected from the group consisting of plain weave, twill weave, leno weave and satin weave.

8. A woven fabric prepreg, according to claim 1, wherein said matrix resin (B) has a fracture toughness $K_{IC}$, after having been cured and measured based on ASTM D 5045-91, of 1.0 Mpa·m$^{1/2}$ or more.

9. A woven fabric prepreg, according to claim 1, wherein said matrix resin (B) has a glass transition temperature, after having been cured, of 160° C. or higher.

10. A woven fabric prepreg, according to claim 1, wherein said matrix resin (B) comprises at least one of an epoxy resin and a phenol resin.

11. A woven fabric prepreg, according to claim 1, wherein said matrix resin (B) comprises at least a glycidyl ether type epoxy resin of 400 or more in epoxy equivalent.

12. A woven fabric prepreg, according to claim 1, wherein said matrix resin (B) contains a thermoplastic resin.

13. A woven fabric prepreg, according to claim 1, wherein said matrix resin (B) comprises at least one resin selected from polyamides, polyethers, polyesters, polyimides and polysulfones.

14. A woven fabric prepreg, according to claim 1, wherein said matrix resin (B) comprises a rubber.

15. A woven fabric prepreg, according to claim 14, wherein the rubber is acrylonitrile-butadiene copolymer rubber.

16. A woven fabric prepreg, according to claim 1, wherein the elastic modulus of the material of said fine particles (C) is lower than the elastic modulus of said matrix resin (B).

17. A woven fabric prepreg, according to claim 1, wherein the total resin content of said matrix resin (B) and said fine particles (C) is 33 to 50 wt % based on the total weight of (A)+(B)+(C).

18. A honeycomb sandwich panel comprising:
   (D) a honeycomb core; and
   a skin panel comprising:
      (A) a woven fabric comprising a plurality of reinforcing fibers;
      (B) a matrix resin surrounding said fibers and comprising a thermosetting rein or a thermosetting resin composition; and
      (C) fine particles of at least one resin selected from the group consisting of polyamides, polyethers, polyesters, polyimides, polysulfones and polyurethanes, wherein the content of said fine particles is 2 to 15% by weight based on the total amount of said matrix resin and said fine particles, said fine particles having a particle size of 1–50 μm.

19. A honeycomb sandwich panel, comprising a honeycomb core and a skin panel which comprises a woven fabric prepreg according to any one of claims 1 through 15, 16 and 17.

20. A honeycomb sandwich panel, according to claim 18, wherein said skin panel exists on both sides of said honeycomb core (D) respectively.

21. A honeycomb sandwich panel, according to claim 18, wherein said honeycomb core (D) is selected from the group consisting of aramid honeycomb core, aluminum honeycomb core, paper honeycomb core, GFRP honeycomb core and graphite honeycomb core.

* * * * *